Sept. 4, 1956
T C. NOON
2,761,646
NOZZLE STRUCTURE
Filed Nov. 30, 1950
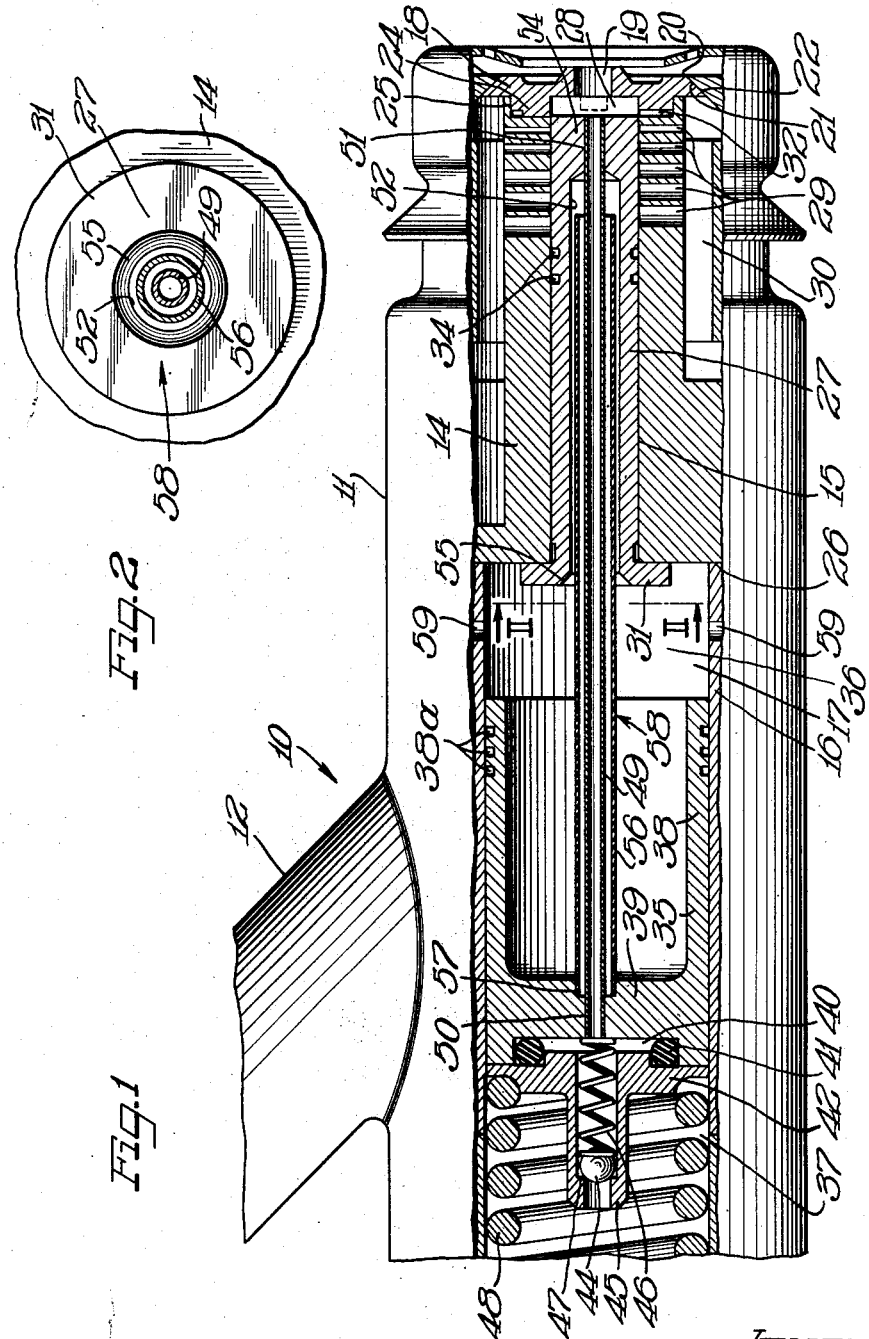
Inventor:
T Cyril Noon

United States Patent Office 2,761,646
Patented Sept. 4, 1956

2,761,646

NOZZLE STRUCTURE

T Cyril Noon, Bainbridge Township, Ohio, assignor to Thompson Products, Inc., Cleveland, Ohio, a corporation of Ohio Application November 30, 1950, Serial No. 198,451

10 Claims. (Cl. 251—62)

This invention relates to improvements in fluid spray nozzles.

More specifically, this invention relates to a variable area fluid discharge nozzle having a reciprocable flow control member embodying a piston and a plunger fixedly connected for concurrent axial movement but having means allowing limited radial displacement therebetween.

In fabricating variable area fluid discharge nozzles it is important that the reciprocable flow control portion be slidable with a minimum of friction in order that proper sensitivity of control be achieved. At the same time it is important that leakage by the piston and plunger portions of the control member be effectively prevented. Thus, either it becomes necessary to manufacture the operative portions of the nozzle with very close tolerances in the individual parts and in the concentricity and relative location of these parts, or it becomes necessary to devise other means to insure proper operation of the nozzle.

In the nozzle of the present invention, a nozzle body having substantially concentric chambers therein contains various fixed parts including a plunger sleeve and an axially adjacent control piston cylinder member. The bores therein are substantially coaxial and contain a reciprocable fluid control member including a plunger slidable in the bore of the plunger sleeve and a control piston slidable in the cylinder member. The piston and the plunger are attached for concurrent axial movement by means of an elongated thin rod-like flexible coupling or connector element such as a tube connected at its end portions substantially axially with respect to the piston and the plunger. In order that the maximum resiliency of the connector element be utilized to allow axial displacement or eccentricity between the piston and the plunger, the connector element is fixed at the remote end portions of both of these members.

To positively inhibit and limit bending or buckling of the thin and flexible connector element a relatively more rigid tube is fixedly attached to the piston and is disposed in substantially concentrically spaced relation about the resilient connector element. The other end of the limit tube extends freely into an elongated counterbore chamber formed axially in the plunger and in substantially spaced relation to the inserted end portion of the rigid tube. Thus, a substantial eccentricity tolerance is allowable in forming and assembling the nozzle.

Therefore, it is an object of the present invention to provide a fluid discharge nozzle incorporating fluid flow control which is sensitive over a wide range of fluid flow and which can be manufactured with substantial tolerances in concentricity location of the operative parts.

Another object of the invention is to provide a variable area fluid discharge nozzle including a reciprocable fluid control member embodying a plunger substantially fixed axially with respect to a piston but with limited resilient radial play therebetween.

A further object of the invention is to provide a reciprocable fluid control member for a variable area discharge nozzle including a piston and a plunger fixedly attached to the end portions of an elongated resilient connector element to insure concurrent axial movement but to allow limited resilient radial play therebetween and with means preventing buckling of the resilient connector element.

Other and further objects, features and advantages of the present invention will become apparent from the following detailed description taken in conjunction with the accompanying drawings illustrating, by way of preferred example only, one embodiment of the invention.

Figure 1 is a fragmentary longitudinal side view of a variable area fluid discharge nozzle according to the present invention with the casing shown partially in elevation and with part broken away to show in longitudinal section the reciprocable fluid flow control member and associated parts in sections; and Figure 2 is an enlarged fragmentary sectional view taken substantially along the line II—II of Figure 1 and showing the end of the plunger and plunger sleeve in elevation.

In Figure 1 is shown a variable area fluid discharge nozzle 10 with a generally cylindrical casing 11 and an integral fluid inlet duct 12. The discharge nozzle 10 as described herein is particularly useful as a fuel injection nozzle for injecting fuel into a combustion can in a gas turbine or aircraft jet engine. However, the invention is useful in any application requiring a device for discharging atomized fluid over a wire range of flow and, therefore, the invention is not intended to be limited to this specific application.

Within the casing 11 are mounted in axial alignment a plunger sleeve 14 having an axial cylindrical bore 15 therethrough and a piston sleeve 16 having an axial cylinder chamber 17 therein. An orifice plate 18, having an axial sharp edged discharge orifice 19 therethrough, closes a coaxial aperture 20 at the forward end of the nozzle. An annular peripheral beveled portion 21 formed about the orifice plate 18 abuts a mating annular beveled portion 22 defining the aperture 20 to retain the orifice plate against displacement axially forwardly out of the nozzle casing 11. An integral annular rib 24 formed about the rearward face of the orifice 18 is disposed in conforming relationship within an annular recess or cavity 25 formed in the forward end of the plunger sleeve 14 for maintaining these parts concentric.

A forwardly facing annular shoulder 26 of the piston sleeve 16 abuts the rearward end of the plunger sleeve 14 to properly space the piston and plunger sleeves within the casing.

In order to provide means for controlling the amount of fluid discharging from the orifice 19 a plunger 27 is disposed in slidable peripherally conforming relationship within the bore 15 of the plunger sleeve 14. A swirl chamber 28 is formed between the end of the plunger 27 and the face of the orifice plate 18 opposed thereto and is defined peripherally by the inner wall of the orifice plate rib 24 and the wall of the plunger sleeve 14 in accordance with the position of the plunger 27. A plurality of variably sized fluid supply ports 29 are formed through the wall of the sleeve 14 and arranged to discharge fluid tangentially into the swirl chamber 28 for creating a whirling vortex therein to provide a conically-shaped atomized spray discharging through the orifice 19. It will be apparent that the volume of flow of fluid discharging from the orifice 19 will be dependent upon the position of the plunger 27 which acts to increase the effective supply port area by uncovering more of the supply ports 29 as it is moved rearwardly.

The fluid supplied to the ports 29 enters the nozzle body 11 through the inlet duct 12 and is delivered through suitable fluid passageway (not shown) within and between the casing 11 and the sleeve 16 into a substantially annular chamber 30 about the ported end portion of the plunger sleeve 14.

In order to positively prevent forward movement of the plunger 27 beyond the position shown in Figure 1, an integral annular radially outwardly extending flange 31 is provided at the rearward end portion of the plunger and in the full forward position of the plunger abuts the end portion of the sleeve 14 about the rearward end of the bore 15.

For insuring a small low pressure flow of fluid into the swirl chamber 28 and out of the discharge orifice 19 when the plunger 27 is in full forward position, a plurality of grooves 32 are formed in the rearward face of the annular rib 24 and conduct fluid from the annular chamber 30 tangentially into the swirl chamber 28.

In order to prevent substantial leakage between the swirl chamber 28 and the piston chamber 17, a pair of annular grooves 34 are provided about the periphery of the plunger 27.

For providing means to control the axial position of the plunger 27 a piston 35 is disposed in slidable peripherally conforming relationship within the cylinder chamber 17. Thus, the piston 35 divides the cylinder chamber 17 into a forward piston chamber 36 and a rearward piston chamber or biasing means chamber 37. The piston 35 has an annular forwardly facing generally cup-shaped portion 38 comprising most of its length and has a relatively heavy transverse web 39 formed at its rearward portion. A shallow cylindrical cavity or recess 40 at the rearward face of the piston 35 contains an O-ring 41 confined therein by a check valve body member 42 disposed in continuous abutting peripheral engagement about the rear face of the piston 35. A ball check valve 44 is disposed in a cylindrical passage extending axially through an integral axial stem 45 formed rearwardly on the valve body 42. A coil compression spring 46 urges the ball check valve 44 against an annular shoulder 47 at the rearward end portion of the passage through the valve stem 45 to prevent rearward flow therethrough, but to allow forward flow.

Biasing means are provided for urging the piston 35 forwardly within the piston chamber 17, and herein such means comprises a coil compression spring 48 disposed within the biasing chamber 37.

In order to prevent leakage between the forward piston chamber 36 and the biasing means chamber 37 a plurality of peripheral grooves 38a are formed about the outer periphery of the piston annular portion 38.

According to the present invention, means are provided for insuring concurrent axial movement of the piston 35 and the plunger 27 and for allowing radial eccentricity or displacement therebetween in order to compensate for slight errors or manufacturing tolerances in concentricity between the bore 15 of the plunger sleeve 14 and the piston cylinder 17. In the present instance such means comprise a thin, axially rigid but transversely resilient elongated rod-like element, herein a stem or tube 49. The tube 49 is attached in axial relationship to the piston 35, as by brazing, at its rear end portion which is inserted into a close fitting axial passage 50 through the piston web 39. The resilient tube 49 is fixedly attached at its forward end portion, as by brazing, within a close fitting axial passage 51 formed through the forward end portion of the plunger 27. An elongated cylindrical counterbore 52 of substantially larger diameter than the tube 49 extends axially from the rearward end of the plunger 27 to a point near the forward end of the plunger thus forming a web 54 which contains the passage 51 axially therethrough. The plunger 27 is countersunk at 55 about the rearward end of the bore 52. Thus, it will be seen that the resilient tube 49 provides a minimum of resistance to radial displacement between the piston 35 and the plunger 27 by being fixedly attached at the remote ends of the piston and the plunger. Also, it will be seen that the piston 35 and the plunger 27 are fixedly connected axially in order to reciprocate in unison.

In order to obtain a desired high degree of flexibility in the coupling tube 49 to eliminate any possible binding of the plunger and piston, lateral stability in the coupling tube must be sacrificed. Therefore, means are provided to protect the resilient tube 49 from injury during assembly of the parts within the housing 11 and during conditions of operation tending to buckle the same. Herein such means comprise a larger diameter relatively rigid tube 56 which is disposed in spaced substantially coaxial relationship about the resilient tube 49 and is fixed at its rearward end portion, as by brazing, within a counterbore 57 formed coaxially with and forwardly of the passage 50 in the piston web 39. The forward end portion of the rigid tube 56 extends into the plunger bore 52 for most of the length thereof and is normally disposed therein in spaced substantially coaxial relationship. Thus, the piston 35, the plunger 27, the resilient tube 49 and the rigid tube 56 form a reciprocable fluid flow control unit 58.

For providing maximum protection against corrosion, the tubes 49 and 56 may be expeditiously formed of a relatively inert material such as stainless steel. Stainless steel also provides a relatively great strength as compared to other relatively inert materials such as brass while still providing the necessary flexibility for the tube 49.

A very definite advantage in ease and cheapness of manufacture results from the use of stainless steel in fabricating the tubes 49 and 56. Both the piston 35 and the plunger 27 are preferably bright hardened in order to preclude unnecessary wear. If a material other than stainless steel, such as brass, is utilized for forming the tubes 49 and 56, brazing of these tubes to the piston and plunger must be done after hardening to prevent annealing of the brass tube. When stainless steel is utilized, the brazing operation and the hardening operation can be accomplished at the same time thus substantially reducing the cost and time of manufacture of the flow control unit 58.

In operation, fluid enters the nozzle casing 11 through the inlet duct 12 and passes through suitable fluid passageway (not shown) within and between the casing 11 and the sleeve 16 into the annular chamber 30 to be whirled into the swirl chamber 28 through the low pressure ports 32 and whichever of the supply ports 29 is uncovered by the plunger 27 and is then discharged in a conically formed atomized spray through the discharge orifice 19. The amount of fluid discharged through the orifice 19 is dependent upon the pressure of the fluid entering the casing 11, a part of which passes into the forward piston chamber 36 through a plurality of ports 59 formed through the wall of the piston chamber sleeve 16. When the pressure force of the fluid within the forward piston chamber 35 is greater than the bias of the spring 48, the flow control member 58 will be shifted proportionately rearwardly resulting in the progressive uncovering of the supply ports 29 to increase the volume of fluid discharged through the orifice 19. A force balance will be achieved between the bias of the spring 48 and the pressure of the fluid within the forward piston chamber 36, and the volume of fluid discharged will always be in accordance with this force balance.

In addition to the function of the resilient tube 49 as described hereinabove, the interior passage through the tube provides a leakage path for any fluid which may seep into the bias chamber 37 and also acts as a pressure release passage for maintaining the pressure therein substantially equal to the pressure in the swirl chamber 28. The ball check valve 44 prevents leakage flow from the bias chamber 37 into the swirl chamber 28 during the minimum flow condition in order to prevent interference with the conical spray pattern in this flow condition.

It will be readily understood from the above description that a maximum degree of resilient radial freeness of movement between the piston 35 and the plunger 27 is provided through the elongated, thin, resilient tube or stem 49 fixed at remote end portions of the piston and the plunger. It will also be understood that the amount of eccentric displacement between the piston and the plunger prior to assembly of the unit 58 in the nozzle is positively limited by means of the rigid tube 56. The tube 56 also provides a protective shroud about the resilient tube 49. Fairly liberal tolerances in concentricity in the arrangement of the various parts within the casing 11 are allowable, and yet the fluid flow control member 58 is simply and ruggedly constructed to withstand a substantial amount of abuse during assembly and to withstand any loads which may be imposed upon it during operation of the nozzle assembly 10.

It should here be understood that the words "eccentricity," "radial displacement" and the like are intended to cover not only parallel radial displacement but also axial angularity.

It will be understood that modifications and variations may be effected without departing from the scope of the novel concepts of the present invention.

I claim as my invention:

1. In a fluid flow controlling unit for spray nozzles, a flow controlling plunger member, a piston member for controlling the plunger member, a thin resilient rod-like stem connecting said plunger and piston member in fixed axially spaced relation but permitting relative radial displacement therebetween by resilient deflection on said stem, and an anti-buckling guard carried by one of said members and disposed protectively in normally closely spaced relation about said stem throughout that portion of the stem liable to buckling under compressive forces in service.

2. In a fluid flow controlling unit, piston and plunger members, a thin resilient stem connecting said members in substantially fixed axially spaced relation but permitting relative eccentricity of said members, and a buckling prevention guard tube connected rigidly to one of said members and encircling said stem in limited spaced relation, said tube being free to move relative to the remaining of said members.

3. In a nozzle construction, a flow control unit comprising a piston having an axial chamber therein open at one end of the piston, a plunger having an axial chamber therein open at one end of the plunger and directed toward the open end of the chamber in the piston, a thin resilient stem having its end portions extending into the respective axial chambers in said piston and said plunger and in radially spaced relation to the walls thereof, the terminal portions of said stem being connected at the end portions of the piston and the plunger opposite to the open chamber ends thereof to retain the same in fixed axially spaced relation but said stem being freely resiliently laterally deflectable within a predetermined range for permitting relative radial displacement of the plunger and piston.

4. In a nozzle structure of the character described, a reciprocable fluid flow control member comprising a piston portion, a plunger portion attached coaxially to said piston portion by means of a relatively resilient elongated stem, said stem permitting radial displacement of said plunger relative to said piston portion, and means fixedly connected to one of said control member portions and cooperatively related to the other of said portions for preventing radial displacement of the plunger portion relative to the piston portion beyond a limited amount.

5. A flow control member for a nozzle comprising a piston, a plunger having an elongated axial chamber therein open at one end thereof, means connecting said piston to said plunger in fixed spaced axial relationship and substantially coaxial therewith, said means permitting radial displacement between the piston and the plunger, a relatively rigid elongated member fixedly attached at one end portion in coaxial relationship to said piston, the free end of said member extending into the axial chamber of said plunger in substantially coaxial spaced relation therewith, said member coacting with the walls of said chamber to limit the possible radial displacement between said piston and said plunger.

6. In a variable area nozzle assembly embodying a movable control mechanism including a piston and a plunger, means for attaching the piston to the plunger in relatively fixed axial and limited radially movable relationship, said means comprising a relatively resilient stem fixedly attached at one end portion to said piston and at its other end portion to said plunger in substantially axial relationship to the piston and the plunger, a tube of greater rigidity than said stem disposed about the same in substantially coaxial spaced relation to guard against buckling of the resilient stem, said tube being fixedly attached at one end portion to the piston, said plunger having an axially inwardly opening passage receiving portions of said stem and said tube therein in substantially concentric spaced relation, the distal end portion of said tube being freely disposed in said passage and contacting the walls of the same upon predetermined relative radial displacement between the piston and the plunger to restrain further lateral relative movement therebetween.

7. In a variable area nozzle, a reciprocable fluid flow control member comprising a piston having an annular portion and an integral web at one end portion, an elongated plunger having an axial chamber therein open at one end of the plunger, an elongated resilient tube fixedly attached axially at one end portion to the center of said piston web and at its other end portion to said plunger adjacent the axially inward end of the passage therein, said tube retaining said piston and said plunger in fixed axially spaced substantially coaxial relationship with the annular portion and the axial chamber in opposed relation, said tube permitting resilient relative radial movement between the piston and the plunger, and an elongated relatively rigid tube fixedly attached at one end portion to said piston web and spaced in substantially concentric relation about said resilient tube, the other end portion of said rigid tube terminating short of the axially inward end of said plunger passage and being disposed in substantially coaxial relation therein, said rigid tube coacting with the walls of said plunger passage to limit the possible resilient radial movement between the plunger and the piston.

8. In a variable area fluid spray nozzle having a piston chamber substantially coaxial with and axially adjacent to a plunger sleeve, a piston disposed in slidable peripherally conforming relation in the piston chamber, fluid pressure urging said piston away from the plunger sleeve, biasing means urging said piston toward the plunger sleeve, a plunger disposed in slidable peripherally conforming relation within the plunger sleeve, an elongated thin resilient metal tube fixedly attached coaxially at its end portions to the piston and the plunger to retain the same in fixed axially spaced relation and to permit resilient eccentricity therebetween, said tube providing a vent passage between the piston chamber and the plunger sleeve axially outwardly of the piston and plunger ends, respectively, said plunger having an elongated axially inwardly open axial chamber therein, an elongated relatively rigid metal tube fixedly attached to the piston and disposed in spaced substantially coaxial relationship about said resilient tube, the free end portion of said rigid tube extending into the elongated chamber in said plunger in spaced substantially coaxial relation thereto, said rigid tube guarding said resilient tube against buckling.

9. In a nozzle construction, a flow control unit comprising a piston having an axial chamber therein open at one end of the piston, a plunger having an axial chamber therein open at one end of the plunger and directed toward the open end of the chamber in the piston, a thin resilient stem having its end portions extending into the respective axial chambers in said piston and said plunger and in radially spaced relation to the walls thereof, the terminal portions of said stem being connected at the end portions of the piston and the plunger opposite to the open chamber ends thereof to retain the same in fixed axially spaced relation but said stem being freely resiliently laterally deflectable within a predetermined range for permitting relative radial displacement of the plunger and piston, and a tubular anti-buckling guard in normally spaced relation about said stem, said guard being fixedly secured to said piston and being free from attachment at its opposite end but extending close to the adjacent portion of the stem.

10. In a nozzle construction, a flow control unit comprising a piston of substantial length and a separate plunger of substantial length spaced substantially apart in an axial direction and having bearing means thereabout for reciprocably guiding the same, said means being discontinuous and thus liable to slight relative eccentricity in the assembly, said plunger and said piston having deep respective recessed axial chambers in the opposing ends thereof and opening toward one another with respective base walls defining the relatively remote ends of the chambers, and a thin resilient stem having its end portions connected respectively to the piston and the plunger base walls on the respective axes thereof to retain the piston and plunger in fixed axially spaced relation, the connection of the stem to the piston and the plunger base wall being fixed and unyielding both laterally and axially, said stem being clear of the longitudinal walls defining said chambers and freely resiliently laterally deflectable throughout the length thereof between the connected end portions thereof and within a predetermined range for compensating for any said relative eccentricity of the piston and plunger so as to enable joint reciprocation of the piston and the plunger as compelled by the stem and free from any tendency toward binding of either the piston or plunger with respect to said bearing guide means thereabout at any point in the reciprocal range thereof.

References Cited in the file of this patent

UNITED STATES PATENTS

| | | |
|---|---|---|
| 770,866 | Mullin | Sept. 27, 1904 |
| 1,422,212 | Larner | July 11, 1922 |
| 1,877,487 | Brooks | Sept. 13, 1932 |
| 2,014,612 | Borton | Sept. 17, 1935 |
| 2,030,143 | Giger-Knusli | Feb. 11, 1936 |
| 2,126,594 | Weatherhead | Aug. 9, 1938 |
| 2,173,838 | Halas | Sept. 26, 1939 |
| 2,261,489 | Venton | Nov. 4, 1941 |
| 2,395,810 | Green | Mar. 5, 1946 |
| 2,418,447 | Arbogast | Apr. 8, 1947 |
| 2,473,879 | Guarnaschelli | June 21, 1949 |
| 2,557,785 | DuFour | June 19, 1951 |
| 2,630,352 | Degnen | Mar. 3, 1953 |
| 2,646,995 | Thompson | July 28, 1953 |